Oct. 13, 1964　　　G. J. WILDT ETAL　　　3,152,648
DRIVEN ENDLESS CHAIN ANTI-CLOGGING DEVICE FOR MULTIPLE PLOWS
Filed Nov. 15, 1962　　　3 Sheets-Sheet 1

INVENTORS
GEORGE J. WILDT
HAROLD G. INHOFER
BY
Merchant, Merchant & Gould
ATTORNEYS INVENTORS
GEORGE J. WILDT
HAROLD G. INHOFER
BY
*Merchant, Merchant & Gould*
ATTORNEYS

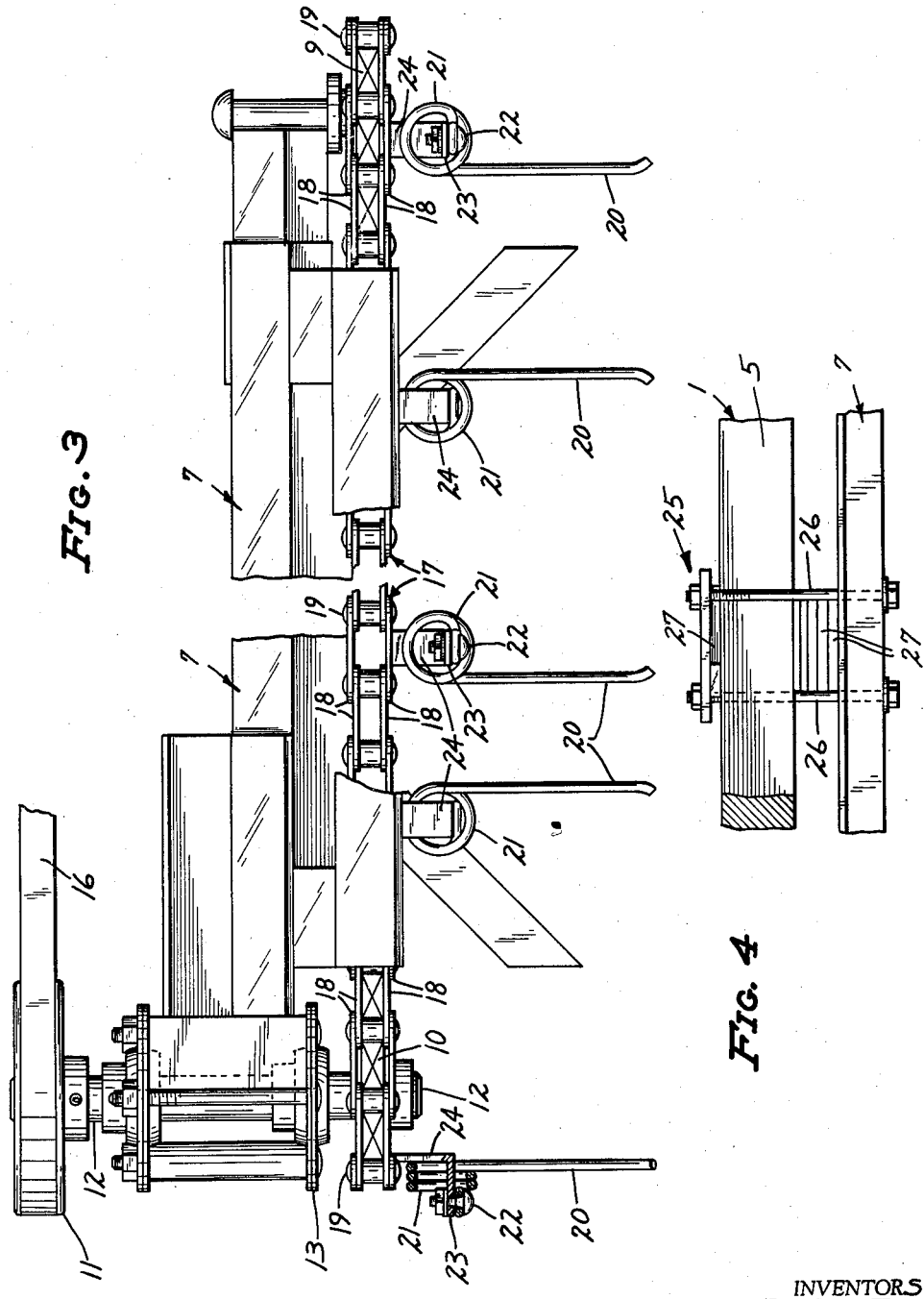

United States Patent Office 3,152,648
Patented Oct. 13, 1964

3,152,648
DRIVEN ENDLESS CHAIN ANTI-CLOGGING
DEVICE FOR MULTIPLE PLOWS
George J. Wildt, Morgan, and Harold G. Inhofer,
Fairfax, Minn.
Filed Nov. 15, 1962, Ser. No. 237,828
3 Claims. (Cl. 172—609)

Our invention relates generally to agricultural plows and more particularly to the improvements in anti-clogging devices for gang plows of the relatively stationary type.

Plows of the above type include a plowshare and an arcuate moldboard. When such a plow is used with damp relatively heavy soil, the frictional engagement between the soil and the moldboard becomes so great as to cause plugging and eventual stoppage. Particularly is this true where there is an excess of weeds and rubbish of any description in the path of the plows.

The primary object of our invention is the provision of a power-operated anti-clogging device for gang plows of the relatively stationary type which not only will completely remove any grass, weeds or other rubbish from in front of the several plows, but will so break up and scatter the earth, which is raised by the share from the furrow created thereby, as to make possible the plowing of earth under conditions of dampness heretofore not thought possible.

A further object of our invention is the provision of a power-driven structure of the class above described which is relatively inexpensive to produce and which may be attached to and removed from a conventional plow beam with a minimum of time and effort and with a minimum of skill.

A further object of our invention is the provision of a device of the class described which incorporates a minimum of working parts, is relatively foolproof, and highly efficient in its operation.

A still further object of our invention is the provision of a device of the class above described which is mounted for adjustment toward and away from the plows to achieve maximum efficiency under varying conditions.

The above and still further objects of our invention will become apparent from the following detailed specification, appended claims and attached drawings.

Referring to the drawings wherein like characters indicate like parts throughout the several views:

FIG. 3 is a view partly in elevation and partly in perspective as seen from the line 3—3 of FIG. 2, some parts being broken away;

FIG. 4 is an enlarged detail view in elevation as seen from the line 4—4 of FIG. 1.

Figure 1:
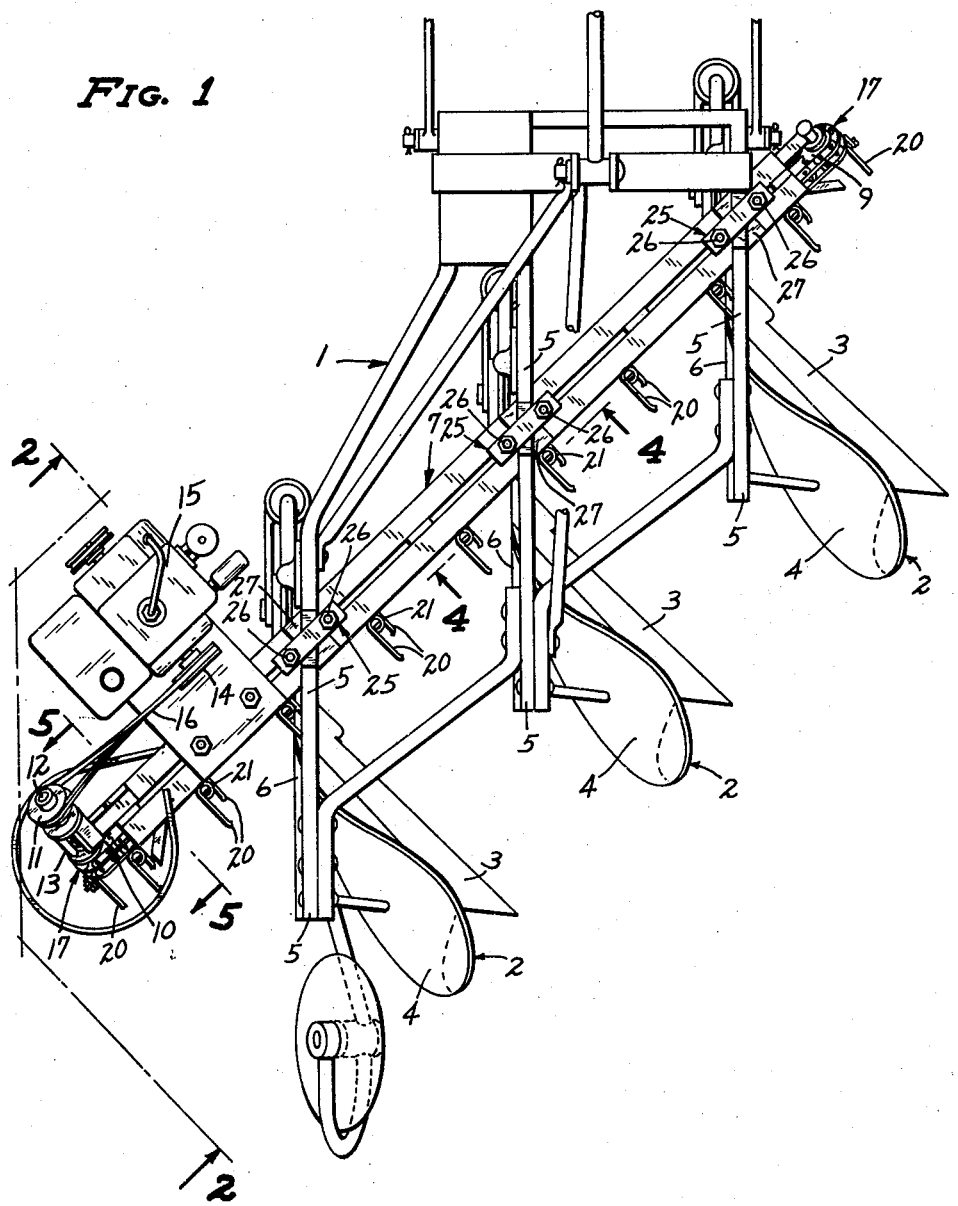
FIG. 1 is a view in top plan of a conventional gang plow showing our novel invention in connection therewith.
Figure 2:
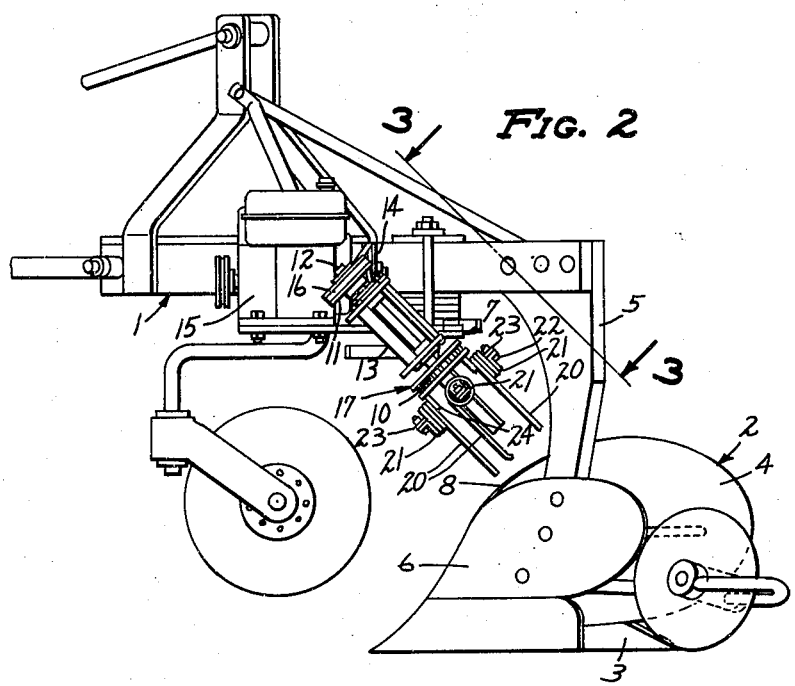
FIG. 2 is a view in side elevation, as seen from the line 2—2 of FIG. 1.
Figure 5:
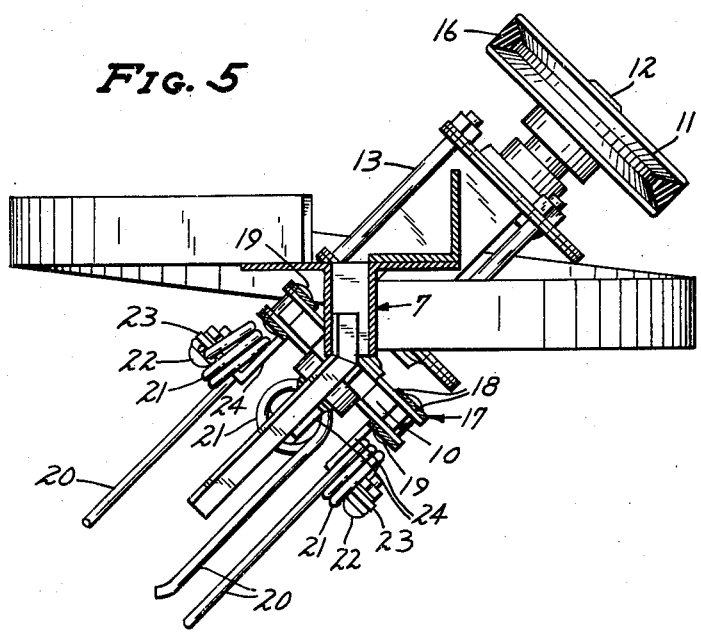
FIG. 5 is an enlarged view in section as seen from the line 5—5 of FIG. 1.

Referring with greater particularity to the drawings, the numeral 1 indicates in its entirety the plow beam structure of a conventional gang plow. Secured in echelon arrangement to the beam structure 1 is a row of relatively stationary plow elements 2 each including a plowshare 3 and a moldboard 4. The means of attaching the plow elements to the beam structure 1 is conventional and includes for each thereof a beam 5 and a frog 6.

Suspended from and carried by the longitudinal beams 5 of the beam structure 1 is an elongated rigid mounting bar 7 which is maintained above and somewhat forwardly of the leading edge 8 of the plow elements 2 and in substantially parallel relationship to the row of plow elements 2. On opposite end portions of the mounting bar 7 are rotary sprockets 9, 10, the former of which is an idler and the latter of which is power-driven through any suitable source such as a pulley 11 mounted on the opposite end of a shaft 12 to which the sprocket 10 is mounted. Shaft 12 is suitably mounted in a bearing 13. Entrained over the pulley 11, and a drive pulley 14 associated with an internal combustion engine 15, is a drive belt 16.

Entrained over the sprockets 9, 10 is a link chain 17, the links of which are identified by 18 and the pivot pins by 19. Carried by longitudinally spaced links 18 are a plurality of resilient fingers 20 which project transversely therefrom in parallel relationship toward the upper forward edges 8 of the plow elements 2. Preferably, and as shown, the fingers 20 are of the type which include a coil portion 21 adjacent their inner ends, said coil portions 21 being rigidly anchored by a suitable carriage bolt or the like 22 to the outer end portions 23 of generally L-shaped anchoring brackets 24. Anchoring brackets 24, in turn, are suitably secured by welding or the like to selected links 18.

It will be noted that the axes of the sprockets 9, 10 are parallel and that they slope downwardly and rearwardly toward the forward edge portions 8 of the plow elements 2. Consequently, the flights of the fingers 20 travel in closely spaced parallel relationship in opposite directions immediately forwardly of the front edge portions 8 of the plow elements and thus not only thoroughly remove any grass, weeds, or other rubbish from in front of the plow elements 2, but also tend to break up and scatter the earth raised by the share and moldboard from the furrow formed by the former, whereby making it possible to plow in moister conditions than heretofore found possible.

For the purpose of varying the spacing between the free ends of the fingers 20 and the front edge portions 8 of the plow elements 2, or in order to arrive at a desired setting of the mounting bar 7 and parts carried thereby on the specifically different commercially available forms of gang plows, the mounting bar 7 is secured to the several longitudinally extended laterally spaced beams 5 by means of suitable U-clamps 25 or the like. Longitudinal adjustments of the bar 7 with respect to the plow elements 2 may be achieved by loosening or tightening of the nut-equipped clamping bolts 26.

Likewise, for the purpose of imparting initial or subsequent vertical adjustments to the mounting bar 7 and parts carried thereby, a plurality of shims 27 are carried by the clamping bolts 26, said shims being interposed between the mounting bar 7 and the beams 5.

Our invention has been thoroughly tested and found to be completely satisfactory for the accomplishment of the above objects, and while we have shown a preferred embodiment thereof, we wish it to be understood that same may be capable of modification without departure from the scope and spirit of the appended claims.

What is claimed is:
1. In a device of the class described,
    (a) a plow beam structure,
    (b) a row of plow elements secured to said beam structure in echelon arrangement,
    (c) a pair of spaced rotary elements journalled for rotation with respect to said beam structure on spaced parallel axes sloping downwardly and rearwardly toward said row of plow elements,
    (d) said axes being disposed adjacent opposite ends of said row of plow elements,
    (e) an endless flexible belt entrained over said rotary elements and providing a pair of closely spaced parallel flights,

(f) a plurality of longitudinally spaced parallel resilient fingers extending transversely from said flights downwardly and rearwardly toward said row of plow elements, (g) the free ends of said fingers travelling in a path which is in closely spaced relation across the front portions of said plow elements, (h) and means for imparting travelling movement to said belt and the fingers carried thereby, whereby the fingers on each of said flights travel in opposite directions across the front end portions of said plow elements.

2. The structure defined in claim 1 in further combination with a mounting bar carried by said beam structure and journalling said rotary elements, and means mounting said bar on said beam structure for adjustments toward and away from said row of plow elements.

3. The structure defined in claim 2 in further combination with means mounting said bar for vertical adjustments with respect to said plow elements.

References Cited in the file of this patent

UNITED STATES PATENTS

| | | |
|---|---|---|
| 482,602 | Warrington | Sept. 13, 1892 |
| 1,038,454 | Stevens | Sept. 10, 1912 |
| 1,173,822 | Lyons | Feb. 29, 1916 |
| 1,241,596 | Woodard | Oct. 2, 1917 |
| 2,877,857 | Baasen | Mar. 17, 1959 |